(12) United States Patent
Wu (10) Patent No.: US 10,274,964 B2
(45) Date of Patent: Apr. 30, 2019

(54) AUTONOMOUS MOBILE ROBOT AND CONTROL METHOD THEREOF

(71) Applicant: ASUSTeK COMPUTER INC., Taipei (TW)

(72) Inventor: Ting-Ying Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/602,402

(22) Filed: May 23, 2017

(65) Prior Publication Data

US 2017/0344014 A1 Nov. 30, 2017

Related U.S. Application Data (60) Provisional application No. 62/342,559, filed on May 27, 2016.

(30) Foreign Application Priority Data

Nov. 28, 2016 (TW) .............................. 105139136 A (51) Int. Cl.
    *B25J 5/00*     (2006.01)
    *G05D 1/02*     (2006.01)
    (Continued)

(52) U.S. Cl.
    CPC ............ *G05D 1/0225* (2013.01); *B25J 5/007* (2013.01); *B25J 19/005* (2013.01);
    (Continued)

(58) Field of Classification Search
    CPC .. G05D 1/0225; G05D 1/0276; G05D 1/0255; B25J 5/007; B25J 19/005; B60L 11/1824; Y10S 901/01
    See application file for complete search history.

(56) References Cited

U.S. PATENT DOCUMENTS

2007/0050086 A1\* 3/2007 Lim ..................... G05D 1/0225
    700/245
2009/0177320 A1\* 7/2009 Lee ........................... B25J 5/00
    700/245

(Continued)

FOREIGN PATENT DOCUMENTS

CN      103317509 A      9/2013
CN      103507067 A      1/2014

(Continued)

OTHER PUBLICATIONS

Office Action issued in corresponding Taiwan patent application dated May 26, 2017.

*Primary Examiner* — Hussein Elchanti
(74) *Attorney, Agent, or Firm* — McClure, Qualey & Rodack, LLP (57) ABSTRACT

A control method of an autonomous mobile robot comprises: receiving a dock signal and executing a control program according to the dock signal. The control program includes detecting a first guiding signal, a second guiding signal and a third guiding signal transmitted by the charging station via the first sensing unit, the second sensing unit and the third sensing unit, sensing a measured distance between the autonomous mobile robot and the charging station when the second guiding signal is detected by the second sensing unit, and the autonomous mobile robot moves toward the charging station or away from the charging station according to the measured distance and a first threshold, and re-executing the control program.

23 Claims, 9 Drawing Sheets

(51) Int. Cl.
 *B25J 19/00* (2006.01)
 *B60L 11/18* (2006.01)
(52) U.S. Cl.
 CPC ........ *B60L 11/1824* (2013.01); *G05D 1/0276* (2013.01); *G05D 1/0255* (2013.01); *Y10S 901/01* (2013.01)

(56) References Cited

U.S. PATENT DOCUMENTS

| | | | |
|---|---|---|---|
| 2013/0214726 A1 | 8/2013 | Teng et al. | |
| 2016/0229060 A1* | 8/2016 | Kim | G05D 1/0225 |
| 2017/0001311 A1* | 1/2017 | Bushman | B25J 9/1666 |
| 2017/0050311 A1* | 2/2017 | Yoo | G05B 19/416 |
| 2017/0102709 A1* | 4/2017 | Kwak | G05D 1/0242 |

FOREIGN PATENT DOCUMENTS

| | | |
|---|---|---|
| CN | 104298234 A | 1/2015 |
| CN | 104298241 A | 1/2015 |
| TW | 201334749 | 9/2013 |
| TW | M480072 | 6/2014 |
| TW | 201504780 | 2/2015 |
| TW | 201520717 | 6/2015 |

\* cited by examiner

AUTONOMOUS MOBILE ROBOT AND CONTROL METHOD THEREOF

CROSS-REFERENCE TO RELATED APPLICATION

This application claims the priority benefit of U.S. provisional application Ser. No. 62/342,559, filed on May 27, 2016 and TW application serial No. 105139136, filed on Nov. 28, 2016. The entirety of the above-mentioned patent applications are hereby incorporated by references herein and made a part of specification.

BACKGROUND OF THE INVENTION

Field of the Invention

The invention relates to automatic control technology and, more specifically, to an autonomous mobile robot and a control method thereof.

Description of the Related Art

With the progress and development of automatic control technology, a plurality of automatic devices are widely used in various work or occasions, such as a robot for carrying heavy objects in a factory, a robot for outer space exploration, a security robot for patrolling, or a robot for environmental clean. An autonomous mobile robot that can move automatically to perform a preset task is common in daily life.

When the autonomous mobile robot recognizes that the battery is low, the autonomous mobile robot needs to charge at a charging station via a guiding signal from the charging station before the power is totally exhausted.

However, a signal receiving and transmitting circuit of a conventional autonomous mobile robot and a charging station is too complex. The positioning calculation is time, power, and cost consuming. Moreover, the conventional autonomous mobile robot is positioned according to an absolute value of the strength of the receiving guiding signal. After the charging station is used for a long time, the positioning is not accurate due to the attenuation of the guiding signal.

BRIEF SUMMARY OF THE INVENTION

According to an aspect of the disclosure, a control method of an autonomous mobile robot and a charging station is provided. The autonomous mobile robot includes a first sensing unit, a second sensing unit and a third sensing unit. The control method comprises to receive a dock signal, and to execute a control program according to the dock signal. The control program detects a first guiding signal, a second guiding signal and a third guiding signal transmitted by the charging station via the first sensing unit, the second sensing unit and the third sensing unit. The control method further senses a measured distance between the autonomous mobile robot and the charging station when the second guiding signal is detected by the second sensing unit. The autonomous mobile robot moves toward the charging station or moves away from the charging station, and re-executes the control program according to the measured distance within a first threshold.

According to another aspect of the disclosure, an autonomous mobile robot is provided. The autonomous mobile robot comprises: a first sensing unit, a second sensing unit, a third sensing unit, a distance sensing unit, a moving unit, and a processing unit. The moving unit drove the first sensing unit, the second sensing unit, the third sensing unit and the distance sensing unit to move. The processing unit is coupled to the first sensing unit, the second sensing unit, the third sensing unit, the moving unit and the distance sensing unit. After a dock signal is received by the autonomous mobile robot, a control program is executed via the processing unit. The control program comprises: detecting a first guiding signal, a second guiding signal and a third guiding signal transmitted by the charging station via the first sensing unit, the second sensing unit and the third sensing unit, sensing a measured distance between the autonomous mobile robot and the charging station via the distance sensing unit when the second guiding signal is detected by the second sensing unit. The autonomous mobile robot moves toward the charging station or moves away from the charging station and re-executing the control program according to the measured distance and a first threshold.

In sum, the autonomous mobile robot and the control method thereof are adapted to an autonomous mobile robot. Then, when the autonomous mobile robot is directed at the charging station, the measured distance between the autonomous mobile robot and the charging station is measured by the distance sensing unit, and the autonomous mobile robot determines to move toward the charging station or away from the charging station according to the measured distance and the first threshold. As a result, it is avoided that the autonomous mobile robot fails dock to the charging station accurately due to insufficient guiding distance. The number of path correction of the autonomous mobile robot is reduced. Then, the efficiency of moving toward the charging station is improved.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
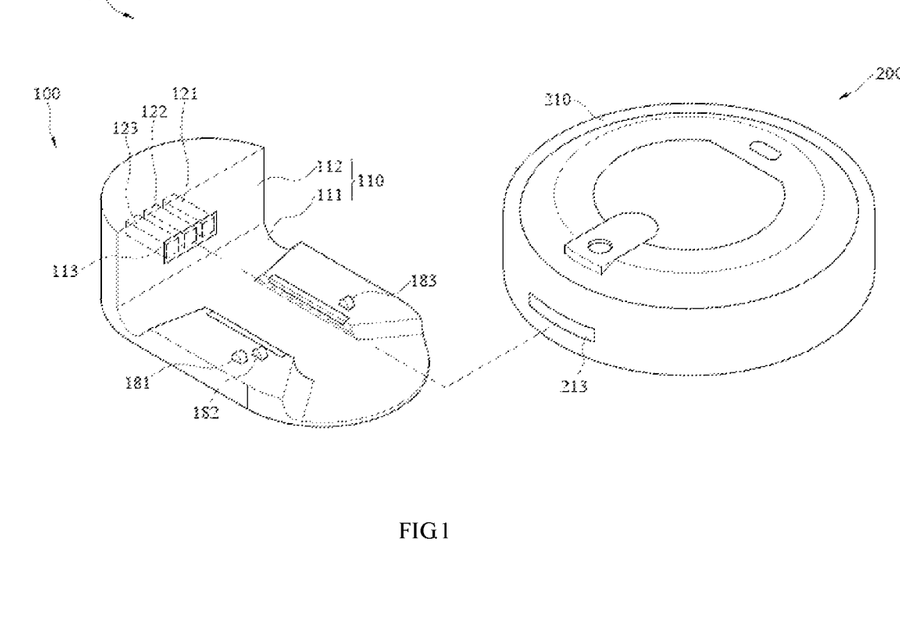
FIG. 1 is a schematic diagram showing an autonomous mobile robot and a charging station in an embodiment.

FIG. 1 is a schematic diagram showing an autonomous mobile robot and a charging station in an embodiment. Please refer to FIG. 1, in an embodiment, an automatic control system 1 includes a charging station 100 and an autonomous mobile robot 200. When the power is low, the autonomous mobile robot 200 is docked at the charging station 100 for charging according to a guiding signal detected from the charging station 100.

In an embodiment, the autonomous mobile robot 200 is a detecting robot for exploration, a security robot for patrolling, a partner robot for home healthcare, or a cleaning robot for environmental clean, which is not limited herein.

Figure 2:
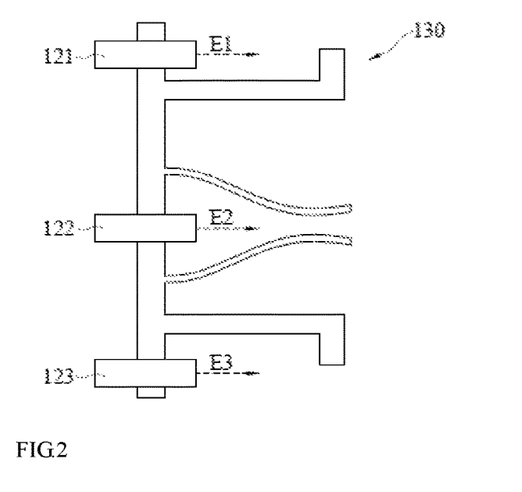
FIG. 2 is a schematic view showing a signal transmitting unit and a separator in an embodiment.
Figure 3:
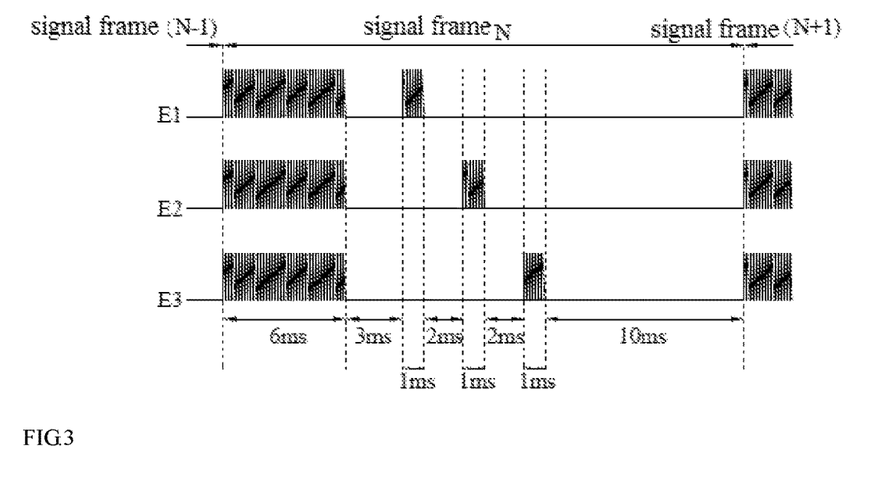
FIG. 3 is a schematic view showing a guiding signal in an embodiment.

FIG. 2 is a schematic view showing a signal transmitting unit and a separator in an embodiment. FIG. 3 is a schematic view showing a guiding signal in an embodiment. Please refer to FIG. 1 to FIG. 3, in an embodiment, the charging station 100 includes a base 110 and at least three signal transmitting units (a first signal transmitting unit 121, a second signal transmitting unit 122 and a third signal transmitting unit 123, respectively). The base 110 includes a support body 111 and a base body 112. The support body 111 is placed on the ground via its bottom surface. The base body 112 is configured at a side of the support body 111. The base body 112 and the support body 111 form an L-shaped base 110.

A first guiding signal E1, a second guiding signal E2, and a third guiding signal E3 are transmitted by the first signal transmitting unit 121, the second signal transmitting unit 122 and the third signal transmitting unit 123, respectively. In an embodiment, the first signal transmitting unit 121, the second signal transmitting unit 122 and the third signal transmitting unit 123 are disposed inside the base body 112. The first guiding signal E1, the second guiding signal E2, and the third guiding signal E3 transmitted by the first signal transmitting unit 121, the second signal transmitting unit 122 and the third signal transmitting unit 123 are transmitted from a corresponding transmission area 113 disposed on the base body 112, respectively.

In an embodiment, the first signal transmitting unit 121, the second signal transmitting unit 122 and the third signal transmitting unit 123 are phototransistors, such as IR transmitters. The guiding signals E1 to E3 transmitted by each of the first signal transmitting unit 121, the second signal transmitting unit 122 and the third signal transmitting unit 123 are transmitted to a specific area via a separator 130. Moreover, each of the first guiding signal E1, the second guiding signal E2, and the third guiding signal E3 has different characteristics, such as different light wavelength or different signal patterns, to an autonomous mobile robot 200 distinguish an emission source according to the light wavelength or the signal pattern of the detected guiding signals E1 to E3 by the autonomous mobile robot 200. In an embodiment, the high frequency carrier wave is added to a constant transmitting frequency of the signal from the signal transmitting units 121 to 123 at different timing, respectively, to form the guiding signals E1 to E3 which are different from each other. For example, as shown in FIG. 3, a high frequency carrier wave signal (56 KHz) is added to or mixed to a signal (38 Hz) with a time interval of 2 ms, respectively. Then, the guiding signals E1 to E3 are formed. As a result, the autonomous mobile robot 200 could recognize which one of the guiding signal is detected according to the time difference of the high frequency carrier wave signal in guiding signals E1 to E3.

Figure 4:
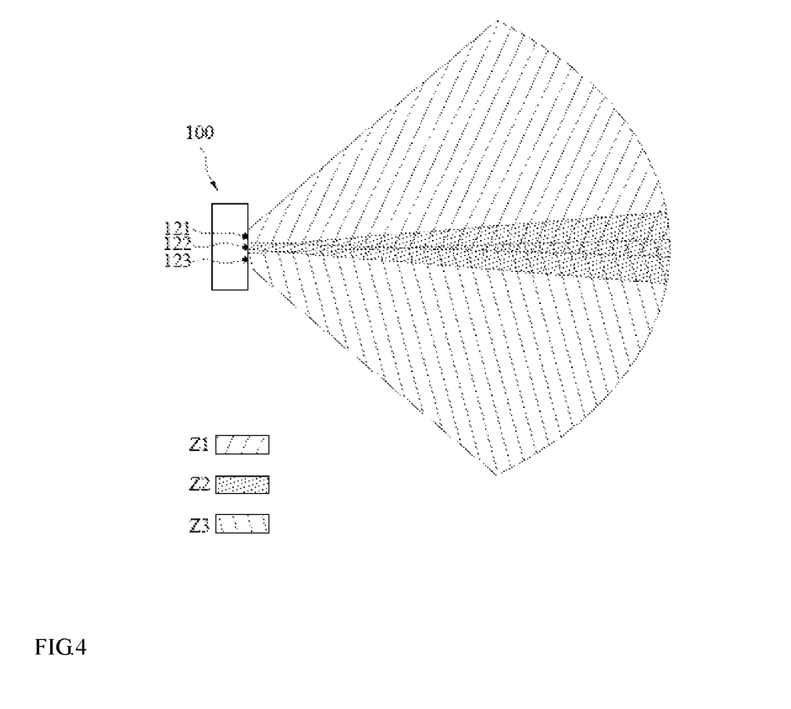
FIG. 4 is a schematic view showing a guiding area in an embodiment.

FIG. 4 is a schematic view showing a guiding area in an embodiment. Please refer to FIG. 1, FIG. 2 and FIG. 4, the second signal transmitting unit 122 is located between the first signal transmitting unit 121 and the third signal transmitting unit 123. In an embodiment, the first guiding signal E1 transmitted by the first signal transmitting unit 121 has a first guiding area Z1 correspondingly. The second guiding signal E2 transmitted by the second signal transmitting unit 122 has a second guiding area Z2 correspondingly. The third guiding signal E3 transmitted by the third signal transmitting unit 123 has a third guiding area Z3 correspondingly. In an embodiment, the second guiding area Z2 is located between the first guiding area Z1 and the third guiding area Z3. As a result, the second guiding signal E2 of the second signal transmitting unit 122 is used to determine the autonomous mobile robot whether the autonomous mobile robot 200 is aligned with the charging station 100. The first guiding signal E1 of the first signal transmitting unit 121 and the third guiding signal E3 of the third signal transmitting unit 123 located at both sides of the second signal transmitting unit 122 are used to the autonomous mobile robot 200 determine whether the autonomous mobile robot 200 deviates to the left or right of the charging station 100.

In an embodiment, the narrower the range of the second guiding area Z2 is, the higher accuracy of positioning is, when the autonomous mobile robot 200 docks to the charging station 100. In an embodiment, the range of the first guiding area Z1 is similar to that of the third guiding area Z3. The range of the first guiding area Z1 is larger than that of the second guiding area Z2, which is not limited herein.

In an embodiment, partial areas of the first guiding area Z1, the second guiding area Z2 and the third guiding area Z3 are overlapped with each other, which is not limited herein. In an embodiment, the guiding areas Z1 to Z3 of at least adjacent signal transmitting units 121 to 123 are partially overlapped. In an embodiment, the second guiding area Z2 located in the middle is partially overlapped with the first guiding area Z1. The second guiding area Z2 and the third guiding area Z3 are partially overlapped. The first guiding area Z1 is partially overlapped with the third guiding area Z3. In another embodiment, the first guiding area Z1 is separated from the third guiding area Z3 with no overlap.

Figure 5:
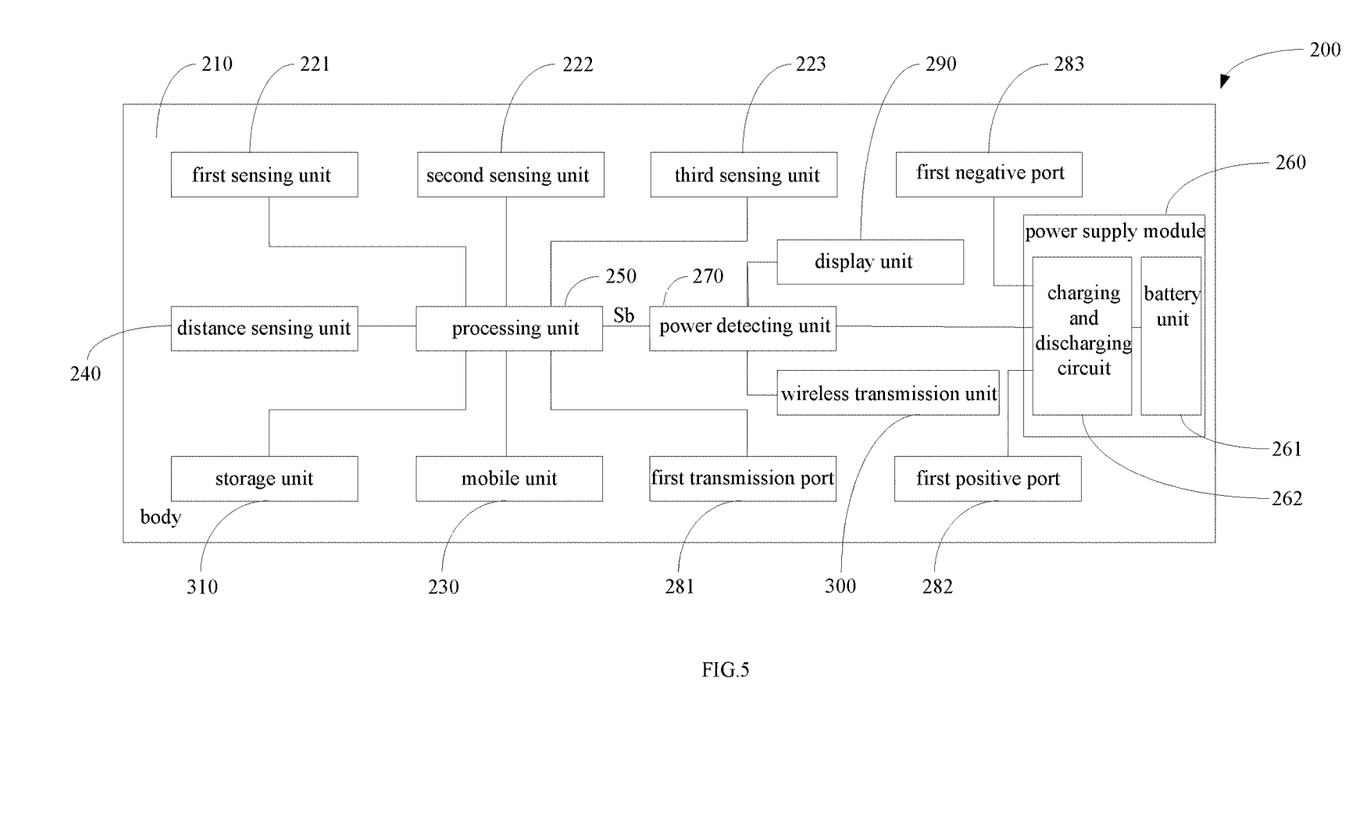
FIG. 5 is a block diagram showing an autonomous mobile robot in an embodiment.

FIG. 5 is a block diagram showing an autonomous mobile robot in an embodiment. Please refer to FIG. 5, in an embodiment, the autonomous mobile robot 200 includes at least three sensing units (a first sensing unit 221, a second sensing unit 222 and a third sensing unit 223), a moving unit 230, a distance sensing unit 240 and a processing unit 250. The processing unit 250 is coupled to the first sensing unit 221, the second sensing unit 222, the third sensing unit 223, the moving unit 230 and the distance sensing unit 240.

In an embodiment, the autonomous mobile robot 200 further includes a casing 210. The sensing units 221 to 223, the distance sensing unit 240 and the processing unit 250 are disposed in the casing 210. The moving unit 230 is disposed under the casing 210 to drive the autonomous mobile robot 200 to rotate and move.

In an embodiment, the processing unit 250 is a Central Processing Unit (CPU), or another programmable microprocessor, a Digital Signal Processor (DSP), a Programmable Logic Controller (PLC), an Application Specific Integrated Circuit (ASIC), a Programmable Logic Device (PLD) or another similar device, which is not limited herein.

Figure 6:
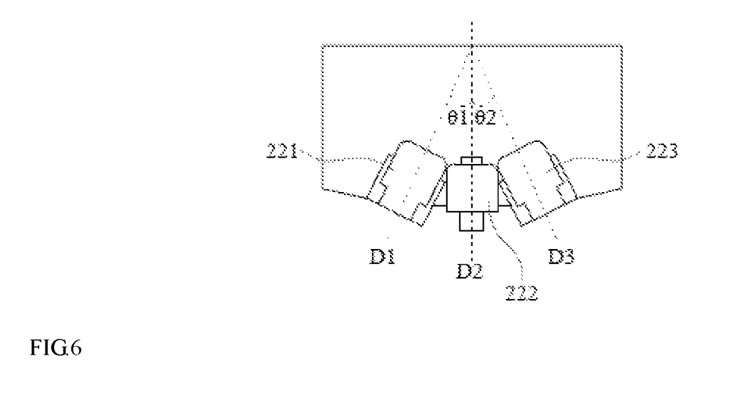
FIG. 6 is a top view showing a sensing unit in an embodiment.
Figure 7:
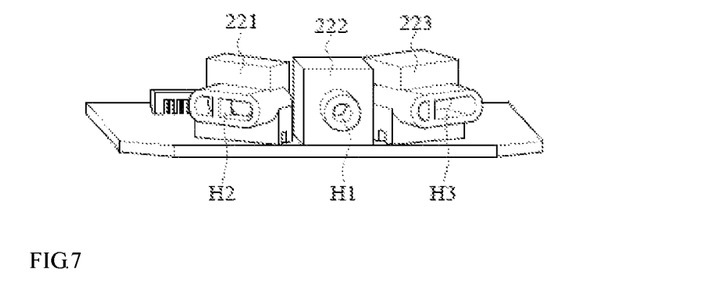
FIG. 7 is a front view showing a sensing unit in an embodiment.

FIG. 6 is a top view showing a sensing unit in an embodiment. FIG. 7 is a front view showing a sensing unit in an embodiment. Please refer to FIG. 1, FIG. 4 to FIG. 7, in an embodiment, the first sensing unit 221, the second sensing unit 222 and the third sensing unit 223 are used to detect the guiding signals E1 to E3 transmitted by the charging station 100. In an embodiment, the first sensing unit 221, the second sensing unit 222 and the third sensing unit 223 are disposed inside the casing 210 and adjacent to a side edge of the casing 210, which is not limited herein. In an embodiment, the first sensing unit 221, the second sensing unit 222 and the third sensing unit 223 receive the guiding signals E1 to E3 from the charging station 100 via the transmission area 213 disposed correspondingly on the side edge of the casing 210.

In an embodiment, the second sensing unit 222 is located between the first sensing unit 221 and the third sensing unit 223. The first sensing unit 221, the second sensing unit 222 and the third sensing unit 223 point to different directions and have different signal receiving range, respectively. As a result, the autonomous mobile robot 200 determines whether the autonomous mobile robot 200 is directed to the charging station 100 according to whether the second guiding signal E2 is detected by the second sensing unit 222. The autonomous mobile robot 200 determines whether the autonomous mobile robot 200 is near the charging station 100 (that is, whether the autonomous mobile robot 200 is in the guiding areas Z1 to Z3) according to whether any one of the guiding signals E1 to E3 is detected by the first sensing unit 221 and the third sensing unit 223 located at both sides of the second sensing unit 222.

In an embodiment, as shown in FIG. 6, the first sensing unit 221 points to a first direction D1. The second sensing unit 222 points to a second direction D2. The third sensing unit 223 points to a third direction D3. A first angle $\theta 1$ is formed between the first direction D1 and the second direction D2. A second angle $\theta 2$ is formed between the second direction D2 and the third direction D3. In an embodiment, the first angle $\theta 1$ equals to the second angle $\theta 2$. In an embodiment, the first angle $\theta 1$ and the second angle $\theta 2$ are 27 degrees, respectively, which is not limited herein. In another embodiment, the first angle $\theta 1$ is different from the second angle $\theta 2$.

In an embodiment, the first sensing unit 221, the second sensing unit 222 and the third sensing unit 223 are photo-receivers, such as IR receivers. In an embodiment, the first sensing unit 221, the second sensing unit 222 and the third sensing unit 223 are covered by covers, respectively. The signal receiving range of each sensing units 221 to 223 are limited by the area of the opening formed on the cover, respectively. In general, the narrower the range of the second sensing unit 222 is, the higher accuracy of positioning is when the autonomous mobile robot 200 docks to the charging station 100. As a result, as shown in FIG. 7, in an embodiment, the opening H2 of the cover of the second sensing unit 222 is less than that of the opening H1 of the cover of the first sensing unit 221, which means the signal receiving range of the second sensing unit 222 is less than that of the first sensing unit 221. The opening H1 of the cover of the first sensing unit 221 is similar to the opening H3 of the cover of the third sensing unit 223, which means the signal receiving range of the first sensing unit 221 is similar to that of the third sensing unit 223, which is not limited herein.

The moving unit 230 moves according to a moving signal of the processing unit 250. In an embodiment, the moving unit 230 includes a driving module and a plurality of rollers. The driving module is coupled to the rollers and the processing unit 250. The roller is rotationally assembled on a bottom of the casing 210. The driving module drives the rollers to rotate to move forward, backward, turn left and right and so on according to the moving signal. Then, the whole autonomous mobile robot 200 moves forward, backward, turn left and right and so on.

The distance sensing unit 240 is used to sense a measured distance between the autonomous mobile robot 200 and at least one reflective object. In an embodiment, the distance sensing unit 240 senses the distance between the autonomous mobile robot 200 and the reflective object (such as, a charging station 100 or a wall) via non-contact distance measurement technology. In an embodiment, the distance sensing unit 240 is an ultrasonic sensor which senses the distance via an ultrasound reflection, which is not limited herein. In another embodiment, the distance sensing unit 240 is an optical distance sensing unit which senses the distance via modulation of light. For example, the optical distance sensing unit is an infrared ray distance sensing unit or a laser distance sensing unit.

In an embodiment, the distance sensing unit 240 is disposed inside the casing 210 and adjacent to a side edge of the casing 210. The distance sensing unit 240 receives and transmits an ultrasonic wave or a light wave used for measured distance via the transmission area 213 correspondingly disposed on the side edge of the casing 210. In an embodiment, the distance sensing unit 240 is arranged along the second direction D2. The distance sensing unit 240 and the second sensing unit 222 are located on a same vertical surface. In an embodiment, the distance sensing unit 240 is located above or below the second sensing unit 222.

In an embodiment, as shown in FIG. 5, the autonomous mobile robot 200 further includes a power supply module 260, a first transmission port 281, a first positive port 282 and a first negative port 283. The power supply module 260 is located inside the casing 210. The first transmission port 281, the first positive port 282 and the first negative port 283 are located on the bottom of the casing 210. In an embodiment, the first positive port 282 and the first negative port 283 are coupled to the power supply module 260. The first transmission port 281 is coupled to the processing unit 250.

As shown in FIG. 1, the charging station 100 further includes a second transmission port 181, a second positive port 182 and a second negative port 183. The second transmission port 181, the second positive port 182 and the second negative port 183 are disposed on the base body 112 and correspond to the first transmission port 281, the first positive port 282 and the first negative port 283 of the autonomous mobile robot 200, respectively.

When the autonomous mobile robot 200 directs to and docks to the charging station 100, the first transmission port 281 of the autonomous mobile robot 200 is contacted with the second transmission port 181 of the charging station 100. The first positive port 282 of the autonomous mobile robot 200 is contacted with the second positive port 182 of the charging station 100. The first negative port 283 of the autonomous mobile robot 200 is contacted with the second negative port 183 of the charging station 100.

In an embodiment, the autonomous mobile robot 200 detects whether the first transmission port 281 is contacted with the second transmission port 181 of the charging station 100. When the first transmission port 281 is contacted with the second transmission port 181 of the charging station 100, the autonomous mobile robot 200 transmits a power supply signal to the charging station 100 via the first transmission port 281 and the second transmission port 181. Then, the charging station 100 charges the power supply module 260 of the autonomous mobile robot 200 via the first positive port 282 and the first negative port 283 which contact with the second positive port 182 and the second negative port 183, respectively.

In an embodiment, the power supply module 260 includes a battery unit 261 and a charging and discharging circuit 262. The first positive port 282 and the first negative port 283 are coupled to the charging and discharging circuit 262. The charging and discharging circuit 262 is coupled to the battery unit 261. In a charging mode, the autonomous mobile robot 200 receives the power supply from the charging station 100 via the first positive port 282 and the first negative port 283, and charges the battery unit 261 via the charging and discharging circuit 262. In a power supply mode, the charging and discharging circuit 262 provides the power for components of the autonomous mobile robot 200 via the power stored in the battery unit 261.

In an embodiment, the autonomous mobile robot 200 further includes a power detecting unit 270. The power detecting unit 270 is disposed inside the casing 210. The power detecting unit 270 is electrically connected to the processing unit 250 and the power supply module 260. In an embodiment, the power detecting unit 270 is used to detect a power capacity of the autonomous mobile robot 200. The power capacity detected by the power detecting unit 270 is shown on a display unit 290 of the autonomous mobile robot 200 or an external device. Then, the remaining power capacity of the autonomous mobile robot 200 can be seen. In an embodiment, the external device is a charging station 100 matching with the autonomous mobile robot 200, a wireless controller matching with the autonomous mobile robot 200, a user device (such as, a mobile phone, a computer and so on) matching with the autonomous mobile robot 200, or a combination thereof. In an embodiment, the power detecting unit 270 wirelessly transmits the information of the detected power capacity to the external device via a wireless transmission unit 300, which is not limited herein.

Figure 8:
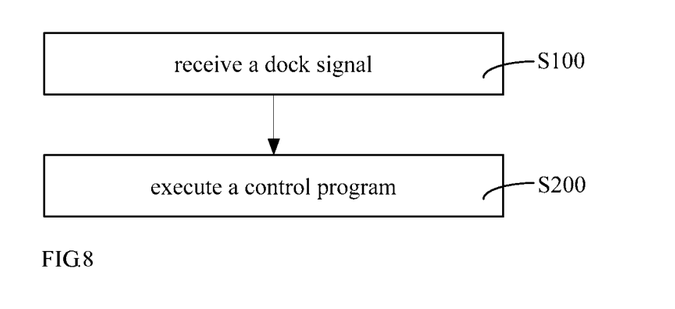
FIG. 8 is a flow diagram showing a control method of an autonomous mobile robot in an embodiment.

FIG. 8 is a flow diagram showing a control method of an autonomous mobile robot in an embodiment. Please refer to FIG. 1 to FIG. 8, in an embodiment, after the autonomous mobile robot 200 receives a dock signal Sb (S100), a control program is executed according to the dock signal Sb (S200) to dock to the charging station 100 for charging. In an embodiment, when the dock signal Sb is received by the processing unit 250, the processing unit 250 executes the control program to move the autonomous mobile robot 200 along a direction via the moving unit 230 for docking to the charging station 100. Then, the autonomous mobile robot 200 docks to the charging station 100 for charging.

In an embodiment, the dock signal Sb is generated and transmitted to the autonomous mobile robot 200 via an external component (such as the charging station 100 or a wireless controller for the autonomous mobile robot 200) of the autonomous mobile robot 200. In another embodiment, the dock signal Sb is generated by an internal component (such as the processing unit 250 or the power detecting unit 270) of the autonomous mobile robot 200. In an embodiment, when the power detecting unit 270 detects a power capacity of the autonomous mobile robot 200. When the power capacity is detected less than a predetermined power capacity (for example, only 10% or 15% of the power is left), the power detecting unit 270 transmits the dock signal Sb to the processing unit 250. Then, the processing unit 250 is configured to execute the control program.

Figure 9:
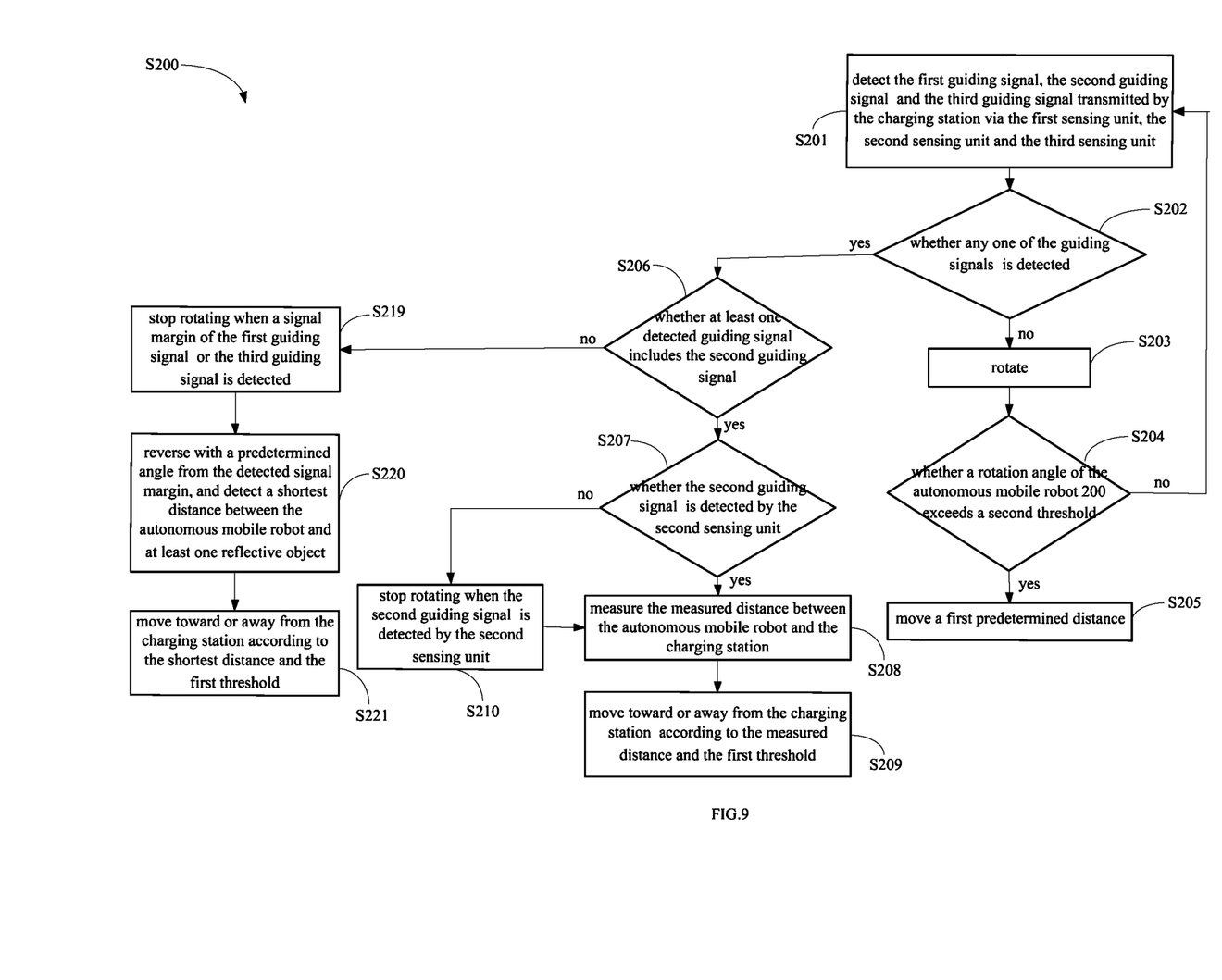
FIG. 9 is a flow diagram showing a step S200 in FIG. 8 in an embodiment.

FIG. 9 is a flow diagram showing a step S200 in FIG. 8 in an embodiment. Please refer to FIG. 1 to FIG. 9, in an embodiment, in the control program, the autonomous mobile robot 200 detects the first guiding signal E1, the second guiding signal E2 and the third guiding signal E3 transmitted by the charging station 100 via the first sensing unit 221, the second sensing unit 222 and the third sensing unit 223 (S201), and determines whether any one of the guiding signals E1 to E3 is detected by the sensing units 221 to 223(S202).

In an embodiment, when the autonomous mobile robot 200 determines that none of the first sensing unit 221, the second sensing unit 222 and the third sensing unit 223 detects any one of the first guiding signal E1, the second guiding signal E2 and the third guiding signal E3, the autonomous mobile robot 200 rotates via the moving unit 230 (S203). Then, the surrounding area of the autonomous mobile robot 200 is detected by the first sensing unit 221, the second sensing unit 222 and the third sensing unit 223. The autonomous mobile robot 200 determines that whether a rotation angle of the autonomous mobile robot 200 exceeds a second threshold (S204). When it is determined that the rotation angle does not exceed the second threshold, back to the step S210, the first sensing unit 221, the second sensing unit 222 and the third sensing unit 223 are used to detect the first guiding signal E1, the second guiding signal E2 and the third guiding signal E3. Conversely, when it is determined that the rotation angle exceeds the second threshold, the autonomous mobile robot 200 moves a first predetermined distance via the moving unit 230 (step S205), and back to the step S200 to re-execute the control program.

In other words, when none of the first sensing unit 221, the second sensing unit 222 and the third sensing unit 223 detects any one of the first guiding signal E1, the second guiding signal E2 and the third guiding signal E3 and the rotation angle of the autonomous mobile robot 200 does not exceed the second threshold, the autonomous mobile robot 200 rotates in one spot to detect the surrounding area of the autonomous mobile robot 200 by the first sensing unit 221, the second sensing unit 222 and the third sensing unit 223, and determines whether any one of the guiding signals E1 to E3 is detected according to the detecting result of each sensing units 221 to 223. When the rotation angle of the autonomous mobile robot 200 exceeds the second threshold and none of the first sensing unit 221, the second sensing unit 222 and the third sensing unit 223 detects any one of the first guiding signal E1, the second guiding signal E2 and the third guiding signal E3, it indicates that the autonomous mobile robot 200 is not in any of the guiding areas Z1 to Z3. Consequently, the autonomous mobile robot 200 moves the first predetermined distance, and then back to the step S200 to re-execute the control program.

In an embodiment, in step S203, the autonomous mobile robot 200 rotates at a first rotation direction, which is not limited herein. In another embodiment, the autonomous mobile robot 200 rotates at a second rotation direction opposite to the first rotation direction. In an embodiment, the first rotation direction and the second rotation direction are an anti-clockwise direction and a clockwise direction, respectively.

In an embodiment, in step S204, the rotation angle of the autonomous mobile robot 200 is obtained via an angle sensor or an electronic compass, which is not limited herein. In an embodiment, the angle sensor is a rotary encoder, which is not limited herein. In an embodiment, the second threshold is 360 degrees.

In an embodiment, in step S205, after the autonomous mobile robot 200 moves by the first predetermined distance toward a direction randomly, the control program is re-executed, which is not limited herein. In an embodiment, the autonomous mobile robot 200 moves along the current direction of the moving unit 230. In an embodiment, the first predetermined distance is a predetermined value within the shortest transmission distance of guiding signals E1 to E3. In an embodiment, the first predetermined distance is 120 centimeters.

In step S202, when it is determines that at least one of the guiding signals E1 to E3 is detected according to the detecting result of the first sensing unit 221, the second sensing unit 222 and the third sensing unit 223, the autonomous mobile robot 200 determines the next step according to the detected guiding signal.

In an embodiment, in step S202, when it is determined that at least one of the guiding signals E1 to E3 is detected, the autonomous mobile robot 200 firstly determines whether at least one detected guiding signal includes the second guiding signal E2 (step S206). In step S206, when the autonomous mobile robot 200 determines that the detected guiding signal includes the second guiding signal E2, the autonomous mobile robot 200 determines that whether the second guiding signal E2 is detected by the second sensing unit 222 (step S207).

In step S207, when the autonomous mobile robot 200 determines that the second guiding signal E2 is detected by the second sensing unit 222, the measured distance between the autonomous mobile robot 200 and the charging station 100 is measured via the distance sensing unit 240 (step S208). Then, the autonomous mobile robot 200 determines to move toward or away from the charging station 100 according to the measured distance and the first threshold (step S209), and back to step S200 to re-execute the control program. In step S207, when the autonomous mobile robot 200 determines that the second guiding signal E2 is not detected by the second sensing unit 222, but by the first sensing unit or the third sensing unit, the autonomous mobile robot 200 keeps rotating, and when the second guiding signal E2 is detected by the second sensing unit 222, the autonomous mobile robot 200 stops rotating (step S210). Then, the step S208 and the step S209 are executed.

Figure 10:
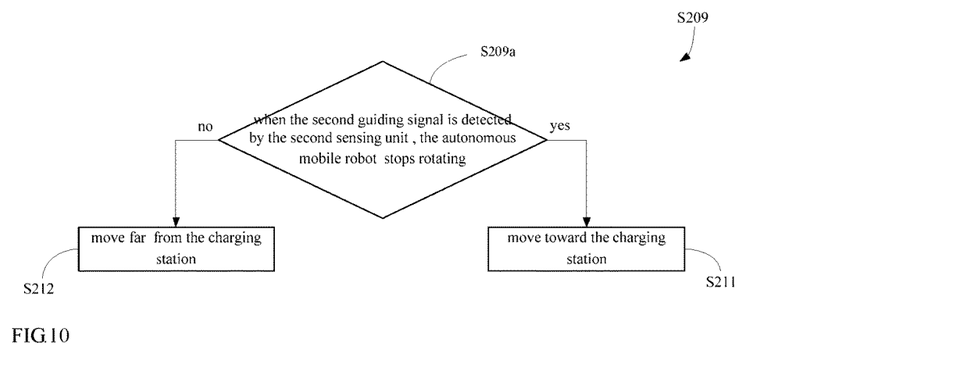
FIG. 10 is a flow diagram showing a step S209 in FIG. 9 in an embodiment.

FIG. 10 is a flow diagram showing a step S209 in FIG. 9 in an embodiment. Please refer to FIG. 1 to FIG. 10, in an embodiment, in step S209, the autonomous mobile robot 200 determines to move toward the charging station 100 (step S211) or move away from the charging station 100 (step S212) according to whether the measured distance is greater than or equals to the first threshold (step S209a). When the measured distance is greater than or equals to the first threshold, the step S211 is executed. The autonomous mobile robot 200 moves toward the charging station 100. When the measured distance is less than the first threshold, the step S212 is executed. Then, the autonomous mobile robot 200 moves away from the charging station 100, and back to the step S200 to re-execute the control program. As a result, it is avoided that the autonomous mobile robot 200 fails dock to the charging station 100 accurately due to being too close to the charging station 100.

Figure 11:
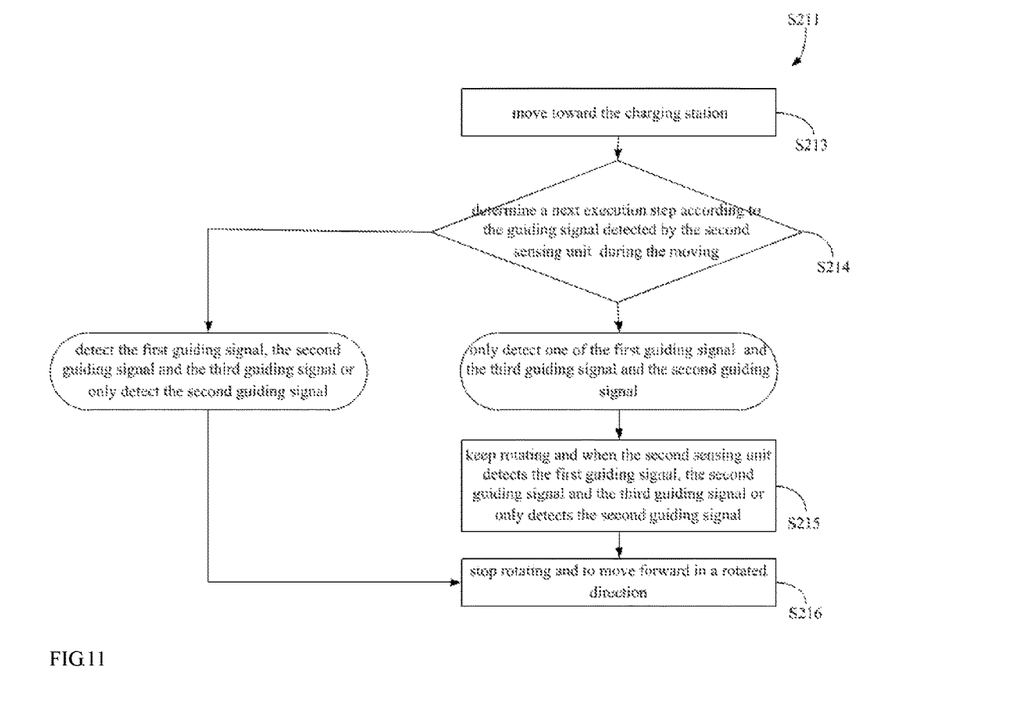
FIG. 11 is a flow diagram showing a step S211 in FIG. 10 in an embodiment.

FIG. 11 is a flow diagram showing a step S211 in FIG. 10 in an embodiment. Please refer to FIG. 1 to FIG. 11, in an embodiment, in step S211, the autonomous mobile robot 200 moves toward the charging station 100 (step S213), and determines a next execution step according to the guiding signal detected by the second sensing unit 222 during the moving (step S214).

In step S214, when the autonomous mobile robot 200 determines that the second sensing unit 222 detects the second guiding signal E2 and one of the first guiding signal E1 and the third guiding signal E3, which indicates that the autonomous mobile robot 200 is located in a signal overlapped area of the first guiding signal E1 and the second guiding signal E2 (that is, a overlapped area of the first guiding area Z1 and the second guiding area Z2) or a signal overlapped area of the third guiding signal E3 and the second guiding signal E2 (that is, a overlapped area of the third guiding area Z3 and the second guiding area Z2), that means, the autonomous mobile robot 200 is slightly deviated from a central area of the guiding signals E1 to E3 (that is, an overlapped area of the first guiding area Z1, the second guiding area Z2 and the third guiding area Z3, or when the guiding areas Z1 to Z3 are not overlapped, an overlapped area where the second guiding area Z2 is not overlapped with the first guiding area Z1 and the third guiding area Z3). As a result, the autonomous mobile robot 200 keep rotating, and when the second sensing unit 222 detects the first guiding signal E1, the second guiding signal E2 and the third guiding signal E3 or only detects the second guiding signal E2 (step S215), then the autonomous mobile robot stops rotating and to move forward in a rotated direction (step S216). As a result, the autonomous mobile robot 200 moves toward the central area of the guiding signals E1 to E3, and then docks to the charging station 100 for charging.

Figure 12:
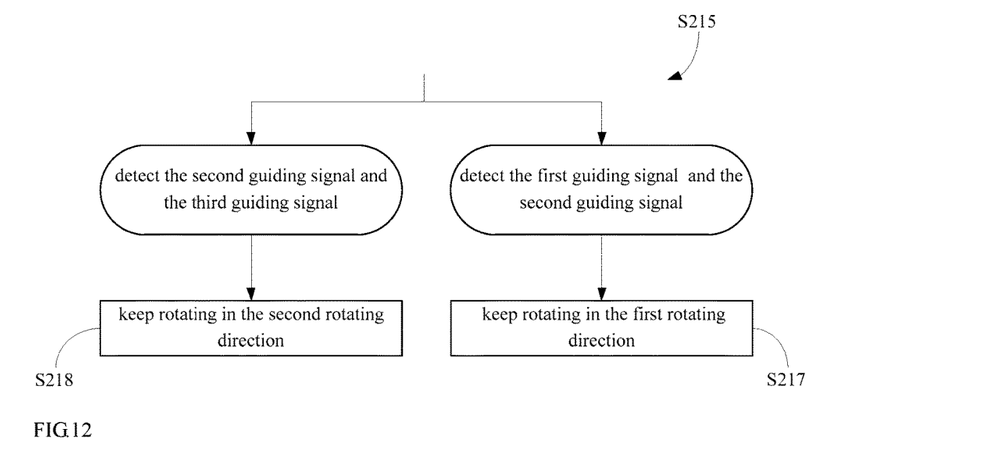
FIG. 12 is a flow diagram showing a step S215 in FIG. 11 in an embodiment.

FIG. 12 is a flow diagram showing a step S215 in FIG. 11 in an embodiment. Please refer to FIG. 1 to FIG. 12, in an embodiment, in step 215, when the autonomous mobile robot 200 determines that the second sensing unit 222 detects the first guiding signal E1 and the second guiding signal E2, the autonomous mobile robot 200 keeps rotating in the first rotating direction (step S217), and when the second sensing unit 222 detects the first guiding signal E1, the second guiding signal E2 and the third guiding signal E3 or only detects the second guiding signal E2, the autonomous mobile robot 200 stops rotating. When the autonomous mobile robot 200 determines that the second sensing unit 222 detects the second guiding signal E2 and the third guiding signal E3, the autonomous mobile robot 200 keeps rotating in the second rotating direction (step S218), and when the second sensing unit 222 detects the first guiding signal E1, the second guiding signal E2 and the third guiding signal E3 or only detects the second guiding signal E2, the autonomous mobile robot 200 stops rotating. In the embodiment, the first rotating direction opposites to the second rotating direction. In an embodiment, the first rotating direction is an anti-clockwise direction, and the second rotating direction is a clockwise direction.

Conversely, as shown in FIG. 11, in step S214, when the autonomous mobile robot 200 determines that the second sensing unit 222 detects the first guiding signal E1, the second guiding signal E2 and the third guiding signal E3 or only detects the second guiding signal E2, it indicates that the autonomous mobile robot 200 is in the central area of the guiding signals E1 to E3. As a result, the autonomous mobile robot 200 executes the step S216, and continues to move in the current direction of the moving unit 230.

As shown in FIG. 10, in an embodiment of the step S212, after the autonomous mobile robot 200 moves a second predetermined distance along a direction away from the charging station 100, then backs to the step S200, the control program is re-executed. In an embodiment, the direction away from the charging station 100 is a direction opposite to the current walking direction of the autonomous mobile robot 200.

In an embodiment, the first threshold is between 70 centimeters and 90 centimeters, which is not limited herein. In an embodiment, the first threshold is preset at 80 centimeters. Moreover, the second predetermined distance is between 110 centimeters and 130 centimeters. In an embodiment, the second predetermined distance is 120 centimeters.

In an embodiment, the second predetermined distance that the autonomous mobile robot 200 moves is a preset constant value. As a result, the first predetermined distance that the autonomous mobile robot 200 moves every time is a same value. In another embodiment, the first predetermined distance that the autonomous mobile robot 200 moves is a difference between a preset closest distance (a constant value) and the measured distance (a value is actually measured by the distance sensing unit 240) at this time. The preset closest distance is the distance between the autonomous mobile robot 200 and the reflective object (such as, charging station 100 or wall). The measured distance is the distance between the autonomous mobile robot 200 and the reflective object. In an embodiment, when the preset closest distance is 120 centimeters, and the measured distance between the autonomous mobile robot 200 and the reflective object is 50 centimeters, the autonomous mobile robot 200 moves by 70 centimeters along a direction away from the reflective object. Then, the measured distance between the autonomous mobile robot 200 and the reflective object is 120 centimeters.

Pleasure refer to FIG. 9, in step S206, when the autonomous mobile robot 200 determines that at least one detected guiding signal does not includes the second guiding signal E2, which indicates that the autonomous mobile robot 200 is located in the first guiding area Z1 or the third guiding area Z3 (that is, an area of the first guiding area Z1 not overlapped with the second guiding area Z2, or an area of the third guiding area Z3 not overlapped with the second guiding area Z2). Consequently, the first sensing unit 221, the second sensing unit 222 or the third sensing unit 223 detects one of the first guiding signal E1 and the third guiding signal E3. Then, the autonomous mobile robot 200 keeps rotating, and when a signal margin of the first guiding signal E1 or the third guiding signal E3 is detected, the autonomous mobile robot 200 stops rotating (step S219), then reverses with a predetermined angle from the detected signal margin, and detects a shortest distance between the autonomous mobile robot 200 and at least one reflective object (step S220). Then, the autonomous mobile robot 200 moves toward or away from the charging station 100 according to the shortest distance and the first threshold (step S221). In some embodiments, "signal margin" as used herein can mean "edge of signal coverage."

In an embodiment of step S219, when the autonomous mobile robot 200 determines that the first sensing unit 221, the second sensing unit 222 and the third sensing unit 223 only detects the first guiding signal E1, the autonomous mobile robot 200 keeps rotating in the first rotating direction, and when the first sensing unit 221 does not detect any of the guiding signals E1 to E3, the autonomous mobile robot 200 stops rotating. After stop rotating, a marginal angle rotated by the moving unit 230 is obtained via an electronic compass or an angle sensor of the autonomous mobile robot 200. The obtained marginal angle is defined as a signal margin of the first guiding signal E1. In an embodiment, when the autonomous mobile robot 200 determines that the first sensing unit 221, the second sensing unit 222 and the third sensing unit 223 only detects the third guiding signal E3, the autonomous mobile robot 200 keeps rotating in the second rotating direction, and when the third sensing unit 223 does not detects any one of the guiding signals E1 to E3, the autonomous mobile robot 200 stops rotating. After stop rotating, a marginal angle rotated by the moving unit 230 is obtained via the electronic compass or the angle sensor of the autonomous mobile robot 200. The obtained marginal angle is defined as a signal margin of the third guiding signal E3. In other words, the signal margin of the first guiding signal E1 is a signal receiving edge of the first sensing unit 221. The signal margin of the third guiding signal E3 is a signal receiving edge of the third sensing unit 223.

In an embodiment, in step S220, the autonomous mobile robot 200 rotates reversely by a predetermined angle in a direction opposite to the rotating direction in the step S219 (that is, rotates in the second rotating direction when in the signal margin of the first guiding signal E1, and rotates in the first rotating direction when in the signal margin of the third guiding signal E3) from the signal margin of the first guiding signal E1 or the signal margin of the third guiding signal E3. During the reverse rotating, the measured distance between the autonomous mobile robot 200 in the predetermined angle and the reflective object in the detection range of the distance sensing unit 240 is measured continuously via the distance sensing unit 240. Then, a minimum measured distance is obtained. The minimum measured distance is regarded as a shortest distance between the autonomous mobile robot 200 and at least one reflective object and corresponds to a rotating angle for the shortest distance.

In an embodiment, the predetermined angle of the reverse rotating of the autonomous mobile robot 200 is 90 degrees. In addition, the reflective object is the charging station 100, wall or any object in the detection range of the distance sensing unit 240 of the autonomous mobile robot 200.

Figure 13:
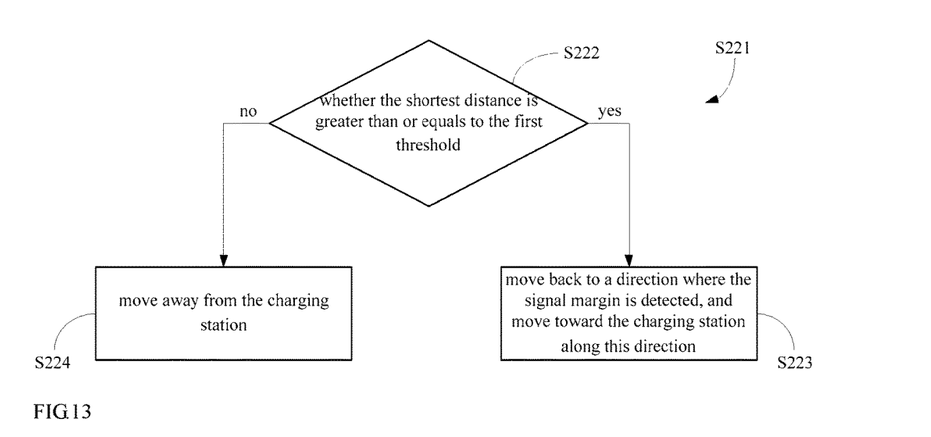
FIG. 13 is a flow diagram showing a step S221 in FIG. 9 in an embodiment.

FIG. 13 is a flow diagram showing a step S221 in FIG. 9 in an embodiment. Please refer to FIG. 1 to FIG. 13, in an embodiment, in step S221, the autonomous mobile robot 200 determines to move toward the charging station 100 or move away from the charging station 100 according to whether the shortest distance is greater than or equals to the first threshold (step S222). When the autonomous mobile robot 200 determines that the shortest distance is greater than or equals to the first threshold, the autonomous mobile robot 200 moves back to a direction where the signal margin is detected, and moves toward the charging station 100 along this direction (step S223). Conversely, when the autonomous mobile robot 200 determines that the shortest distance is less than the first threshold, the autonomous mobile robot 200 moves away from the charging station 100 (step S224).

In an embodiment, in step S223, after the autonomous mobile robot 200 moves forward by a third predetermined distance, backs to the step S200, to re-execute the control program. In an embodiment, the third predetermined distance is less than the first threshold.

In an embodiment of step S224, the autonomous mobile robot 200 moves back to a direction where the shortest distance is detected, and moves away from the charging station 100 along this the direction. After the autonomous mobile robot 200 moves a fourth predetermined distance away from at least one reflective object, backs to step the S200 to re-execute the control program. In an embodiment, the fourth predetermined distance is between 100 centimeters and 130 centimeters. In an embodiment, the fourth predetermined distance is 120 centimeters.

Figure 14:
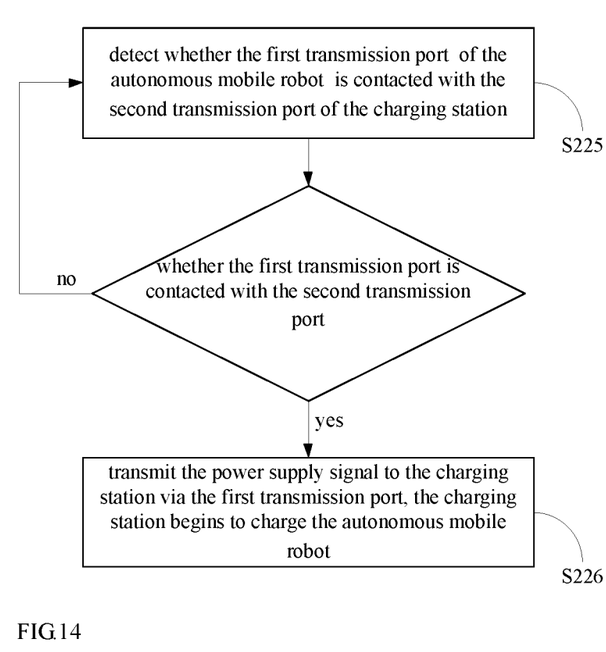
FIG. 14 is a flow diagram showing detection for an autonomous mobile robot in an embodiment.

FIG. 14 is a flow diagram showing detection for an autonomous mobile robot in an embodiment. Please refer to FIG. 1 to FIG. 14, in an embodiment, when the autonomous mobile robot 200 moves toward the charging station 100, such as in the step S211, the step S213, the step S216 or the step S223, the control program further includes a step of detecting whether the first transmission port 281 of the autonomous mobile robot 200 is contacted with the second transmission port 181 of the charging station 100 (step S225). Then, it is determined that whether the first positive port 282 and the first negative port 283 of the autonomous mobile robot 200 are contacted with the second positive port 182 and the second negative port 183, respectively. When it is detected that the first transmission port 281 of the autonomous mobile robot 200 is contacted with second transmission port 181 of the charging station 100, the moving unit 230 is not driven. The power supply signal is transmitted to the charging station 100 via the first transmission port 281. Then, the charging station 100 begins to charge the autonomous mobile robot 200 (step S226). Conversely, when it is not detected that the first transmission port 281 of the autonomous mobile robot 200 is contacted with the second transmission port 181 of the charging station 100, the step S232 is executed repeatedly.

In an embodiment, as shown in FIG. 5, the autonomous mobile robot 200 further includes a storage unit 310. The storage unit 310 is used to store the control program, the first threshold, the second threshold, the first predetermined distance, the second predetermined distance, the third predetermined distance, the fourth predetermined distance, the predetermined angle, the measured distance, the sensing distance, the rotating angle and so on.

In sum, the autonomous mobile robot and the control method thereof are adapted to an autonomous mobile robot. Then, when the autonomous mobile robot is directed at the charging station, the measured distance between the autonomous mobile robot and the charging station is measured by the distance sensing unit. The autonomous mobile robot determines to move toward the charging station or move away from the charging station according to the measured distance and the first threshold. As a result, it is avoided that the guiding distance is too short to dock to the charging station accurately. The time of path correction of the autonomous mobile robot is reduced. Then, the efficiency of docking is improved.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A control method adapted to an autonomous mobile robot and a charging station, the autonomous mobile robot including a first sensing unit, a second sensing unit and a third sensing unit, the control method comprising:
   receiving a dock signal, and
   executing a control program according to the dock signal, wherein the control program includes:
   detecting a first guiding signal, a second guiding signal and a third guiding signal transmitted by the charging station via the first sensing unit, the second sensing unit and the third sensing unit,
   sensing a measured distance between the autonomous mobile robot and the charging station when the second guiding signal is detected by the second sensing unit,
   moving the autonomous mobile robot toward the charging station or away from the charging station and re-executing the control program according to the measured distance and a first threshold;
   wherein the control program further comprises:
   driving the autonomous mobile robot keeps rotating, and when a signal margin of the first guiding signal or the third guiding signal is detected, the autonomous mobile robot stop rotating, when the second guiding signal is not detected by the first sensing unit, the second sensing unit and the third sensing unit, but the first guiding signal or the third guiding signal is detected by one of the first sensing unit, the second sensing unit and the third sensing unit;
   reversing the autonomous mobile robot with a predetermined angle from the detected signal margin, and a shortest distance between the autonomous mobile robot and at least one reflective object is detected; and
   moving the autonomous mobile robot toward the charging station or away from the charging station according to the shortest distance and the first threshold.

2. The control method of the autonomous mobile robot according to claim 1, wherein in the step of moving the autonomous mobile robot toward the charging station or away from the charging station according to the measured distance and the first threshold, when the measured distance is less than the first threshold, the autonomous mobile robot moves away from the charging station and re-executes the control program.

3. The control method of the autonomous mobile robot according to claim 1, wherein in the step of moving the autonomous mobile robot toward the charging station or away from the charging station according to the measured distance and the first threshold, when the measured distance is greater than or equals to the first threshold, the autonomous mobile robot moves toward the charging station.

4. The control method of the autonomous mobile robot according to claim 3, wherein when the second sensing unit detects the second guiding signal and one of the first guiding signal and the third guiding signal, the autonomous mobile robot rotates, and when the second sensing unit detects the first guiding signal, the second guiding signal and the third guiding signal or only detects the second guiding signal, the autonomous mobile robot stops rotating and to move forward in a rotated direction.

5. The control method of the autonomous mobile robot according to claim 4, wherein when the second sensing unit detects the first guiding signal and the second guiding signal, the autonomous mobile robot rotates in a first rotating direction; and
   when the second sensing unit detects the second guiding signal and the third guiding signal, the autonomous mobile robot rotates in a second rotating direction;
   wherein the second rotating direction opposites to the first rotating direction.

6. The control method of the autonomous mobile robot according to claim 1, the control program further comprises:
   when the second guiding signal is not detected by the second sensing unit but by the first sensing unit or the third sensing unit, the autonomous mobile robot keeps rotating, and when the second guiding signal is detected by the second sensing unit, the autonomous mobile robot stops rotating.

7. The control method of the autonomous mobile robot according to claim 1, wherein in the step of the autonomous mobile robot moving toward the charging station or move away from the charging station according to the shortest distance and the first threshold, when the shortest distance is greater than or equals to the first threshold, the autonomous mobile robot moves back to a direction where the signal margin is detected, and moves toward the charging station along the direction where the signal margin is detected.

8. The control method of the autonomous mobile robot according to claim 1, wherein in the step of the autonomous mobile robot moving toward the charging station or move away from the charging station according to the shortest distance and the first threshold, when the shortest distance is less than the first threshold, the autonomous mobile robot moves away from the charging station and re-executes the control program.

9. The control method of the autonomous mobile robot according to claim 1, the control program further comprises:
the autonomous mobile robot rotates when none of the first guiding signal, the second guiding signal and the third guiding signal is detected by the first sensing unit, the second sensing unit and the third sensing unit; and
the autonomous mobile robot moves by a first predetermined distance and re-executes the control program when a rotation angle of the autonomous mobile robot exceeds a second threshold and none of the first guiding signal, the second guiding signal and the third guiding signal is detected by the first sensing unit, the second sensing unit and the third sensing unit.

10. The control method of the autonomous mobile robot according to claim 1, wherein the control program further comprises:
detecting whether the first transmission port of the autonomous mobile robot is contacted with the second transmission port of the charging station when the autonomous mobile robot moves toward the charging station; and
transmitting a power supply signal to the charging station by the autonomous mobile robot for charging autonomous mobile robot when the first transmission port is contacted with the second transmission port is detected.

11. The control method of the autonomous mobile robot according to claim 1, wherein the first guiding signal, the second guiding signal and the third guiding signal are different from each other.

12. An autonomous mobile robot, comprising:
a first sensing unit;
a second sensing unit;
a third sensing unit;
a distance sensing unit;
a moving unit, drove the first sensing unit, the second sensing unit, the third sensing unit and the distance sensing unit to move; and
a processing unit, coupled to the first sensing unit, the second sensing unit, the third sensing unit, the moving unit and the distance sensing unit, is configured to execute a control program when a dock signal is received, the control program comprising:
detecting a first guiding signal, a second guiding signal and a third guiding signal transmitted by the charging station via the first sensing unit, the second sensing unit and the third sensing unit,
sensing a measured distance between the autonomous mobile robot and the charging station via the distance sensing unit when the second guiding signal is detected by the second sensing unit; and
moving the autonomous mobile robot toward the charging station or away from the charging station according to the measured distance and a first threshold, and re-executing the control program;
wherein the control program further comprises:
the autonomous mobile robot rotate to a signal margin of the first guiding signal or t the third guiding signal when none of the first sensing unit, the second sensing unit and the third sensing unit detects the second guiding signal and any one of the first sensing unit, the second sensing unit and the third sensing unit detects the first guiding signal or the third guiding signal;
the autonomous mobile robot rotates reversely by a predetermined angle from the signal margin, and detects a shortest distance between the autonomous mobile robot and at least one reflective object via the distance sensing unit; and
the autonomous mobile robot moves toward the charging station or moves away from the charging station according to the shortest distance and the first threshold.

13. The autonomous mobile robot according to claim 12, wherein the autonomous mobile robot further comprises:
a power detecting unit configured to detect a power capacity of the autonomous mobile robot, and when the power capacity is detected less than a predetermined power capacity, the dock signal is transmitted to the processing unit.

14. The autonomous mobile robot according to claim 12, further comprises:
a power supply module;
a first transmission port;
a first positive port coupled to the power supply module; and
a first negative port coupled to the power supply module;
wherein the processing unit is coupled to the first transmission port, when the processing unit detects that the first transmission port is contacted with the second transmission port of the charging station, the processing unit outputs a power supply signal, and the power supply signal is transmitted to the charging station via the first transmission port and the second transmission port, to charge the power supply module via the first positive port and the first negative port.

15. The autonomous mobile robot according to claim 12, wherein in the step of moving the autonomous mobile robot toward the charging station or away from the charging station according to the measured distance and the first threshold, when the measured distance is less than the first threshold, the autonomous mobile robot moves away from the charging station and re-executes the control program.

16. The autonomous mobile robot according to claim 12, wherein in the step of moving the autonomous mobile robot toward the charging station or away from the charging station according to the measured distance and the first threshold, when the measured distance is greater than or equals to the first threshold, the autonomous mobile robot moves toward the charging station.

17. The autonomous mobile robot according to claim 16, wherein the step of moving the autonomous mobile robot toward the charging station comprises:
moving toward the charging station via the moving unit;
rotating the autonomous mobile robot, and when the second sensing unit detects the first guiding signal, the second guiding signal and the third guiding signal or only detects the second guiding signal, the autonomous mobile robot stops rotating; and
moving the autonomous mobile robot forward along a rotated direction when the second sensing unit detects the second sensing unit and one of the first guiding signal and the third guiding signal.

18. The autonomous mobile robot according to claim 17, wherein the step of stopping rotating and to moves the autonomous mobile robot forward along the rotated direction t, further comprises:

when the second sensing unit detects the first guiding signal and the second guiding signal, the autonomous mobile robot rotates in a first rotating direction; and when the second sensing unit detects the second guiding signal and the third guiding signal, the autonomous mobile robot rotates in a second rotating direction, and the second rotating direction opposites to the first rotating direction.

19. The autonomous mobile robot according to claim 12, the control program further comprises:

when the second sensing unit does not detect the second guiding signal, and the first sensing unit or the third sensing unit detects the second guiding signal, the autonomous mobile robot rotates, and when the second sensing unit detects the second guiding signal, the autonomous mobile robot stop rotating.

20. The autonomous mobile robot according to claim 12, wherein in the step of the autonomous mobile robot moves toward the charging station or move away from the charging station according to the shortest distance and the first threshold, when the shortest distance is greater than or equals to the first threshold, the autonomous mobile robot moves back to a direction where the signal margin is detected via the moving unit, and the automatic walking moves toward the charging station from the direction where the signal margin is detected.

21. The autonomous mobile robot according to claim 12, wherein in the step of the autonomous mobile robot moves toward the charging station or move away from the charging station according to the shortest distance and the first threshold, when the shortest distance is less than the first threshold, the autonomous mobile robot moves away from the charging station, and the processing unit re-executes the control program.

22. The autonomous mobile robot according to claim 12, the control program further comprises:

the autonomous mobile robot rotate when none of the first sensing unit, the second sensing unit and the third sensing unit detects any one of the first guiding signal, the second guiding signal and the third guiding signal; and the autonomous mobile robot move the first predetermined distance and re-executing the control program when a rotation angle of the autonomous mobile robot exceeds a second threshold and none of the first sensing unit, the second sensing unit and the third sensing unit detects any one of the first guiding signal, the second guiding signal and the third guiding signal.

23. The autonomous mobile robot according to claim 12, wherein the first guiding signal, the second guiding signal and the third guiding signal are different from each other.

* * * * *